(12) United States Patent  
Suwa et al.

(10) Patent No.: US 12,277,203 B2  
(45) Date of Patent: Apr. 15, 2025

(54) INFORMATION PROCESSING SYSTEM, INPUT DEVICE, USER AUTHENTICATION METHOD, SERVER DEVICE, AND BIOMETRIC AUTHENTICATION DEVICE

(71) Applicant: Sony Interactive Entertainment Inc., Tokyo (JP)

(72) Inventors: Yoshihiko Suwa, Tokyo (JP); Masayuki Ebata, Tokyo (JP); Yasunori Yasuda, Tokyo (JP); Yoshiyuki Imada, Tokyo (JP); Hirotaka Ishikawa, Tokyo (JP); Yu Sugita, San Mateo, CA (US); Takashi Isa, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 523 days.

(21) Appl. No.: 17/286,633

(22) PCT Filed: Oct. 15, 2019

(86) PCT No.: PCT/JP2019/040426  
§ 371 (c)(1),  
(2) Date: Apr. 19, 2021

(87) PCT Pub. No.: WO2020/085141  
PCT Pub. Date: Apr. 30, 2020

(65) Prior Publication Data  
US 2021/0374219 A1 Dec. 2, 2021

Related U.S. Application Data

(60) Provisional application No. 62/748,621, filed on Oct. 22, 2018.

(51) Int. Cl.  
*G06F 21/32* (2013.01)

(52) U.S. Cl.  
CPC .................................. *G06F 21/32* (2013.01)

(58) Field of Classification Search  
CPC .................................................. G06F 21/30–36  
See application file for complete search history.

(56) References Cited

U.S. PATENT DOCUMENTS 7,024,556 B1 * 4/2006 Hadjinikitas ....... H04L 63/0815  
713/168  
2007/0094715 A1 * 4/2007 Brown .................... G06F 21/34  
726/5

(Continued)

FOREIGN PATENT DOCUMENTS

CN 110196643 A * 9/2019  
JP 10285153 A 10/1998  
(Continued)

OTHER PUBLICATIONS

Cheat sheet: Two-factor authentication by Brandon Vigliarolo; Publisher: TechRepublic; 2017 (Year: 2017).*

(Continued)

*Primary Examiner* — Madhuri R Herzog  
(74) *Attorney, Agent, or Firm* — Kilpatrick Townsend & Stockton LLP

(57) ABSTRACT

An input device for inputting a user operation includes a data-for-authentication holding unit that holds data for authentication regarding one or more registered users, a fingerprint sensor that accepts fingerprint information of a user, and a fingerprint authentication unit that checks the accepted fingerprint information against the data for authentication regarding the one or more registered users. When the fingerprint authentication unit 84 succeeds in biometric authentication, a communication unit transmits a network account of the user to an information processing device. The information processing device includes a user authentication (Continued)

unit that checks the received network account against network accounts of registered users held in a registered user information holding unit.

9 Claims, 12 Drawing Sheets

(56) References Cited

U.S. PATENT DOCUMENTS

| | | | | |
|---|---|---|---|---|
| 2009/0113523 | A1* | 4/2009 | Vedula | H04L 63/0815 726/4 |
| 2016/0241542 | A1* | 8/2016 | Kim | H04L 63/083 |
| 2016/0267261 | A1* | 9/2016 | Tooley, II | G06F 21/34 |

FOREIGN PATENT DOCUMENTS

| | | |
|---|---|---|
| JP | 11355266 A | 12/1999 |
| JP | 2002222022 A | 9/2002 |
| JP | 2006180379 A | 7/2006 |
| JP | 2006352223 A | 12/2006 |
| JP | 2016170549 A | 9/2016 |
| WO | 2015004744 A1 | 1/2015 |

OTHER PUBLICATIONS

International Search Report for corresponding PCT Application No. PCT/JP2019/040426, 6 pages, dated Jan. 21, 2020.

* cited by examiner

F I G . 5

| FINGER ID | NETWORK ACCOUNT | PRIVATE KEY | PUBLIC KEY |
|---|---|---|---|
| 1 | NW_ID_A | PRI_Key_A | PUB_Key_A |
| 2 | NW_ID_B | PRI_Key_B | PUB_Key_B |
| 3 | NW_ID_C | PRI_Key_C | PUB_Key_C |
| ⋮ | ⋮ | ⋮ | ⋮ |

89

FIG. 6
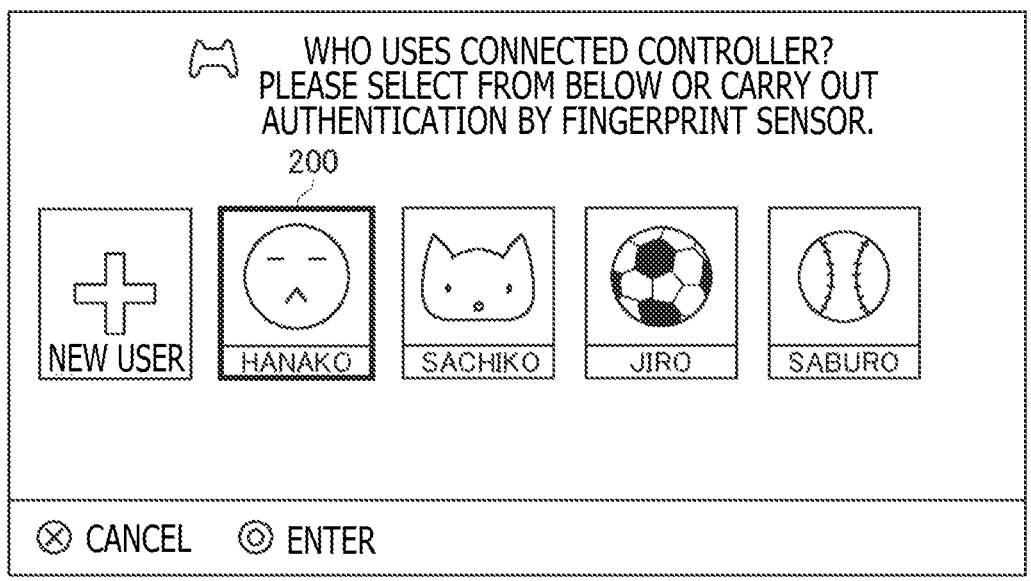
(a)
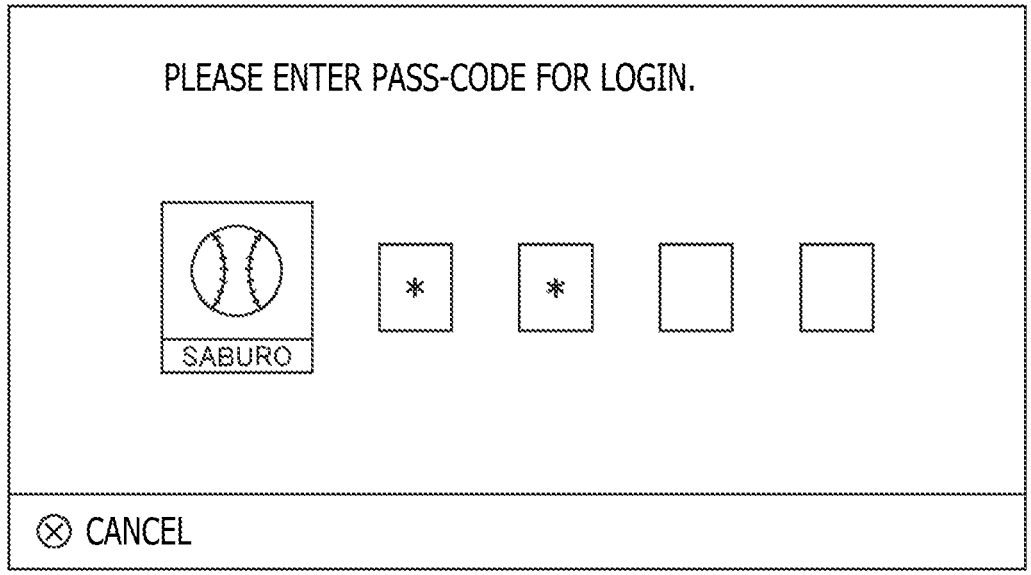
(b)

FIG.10
(a)
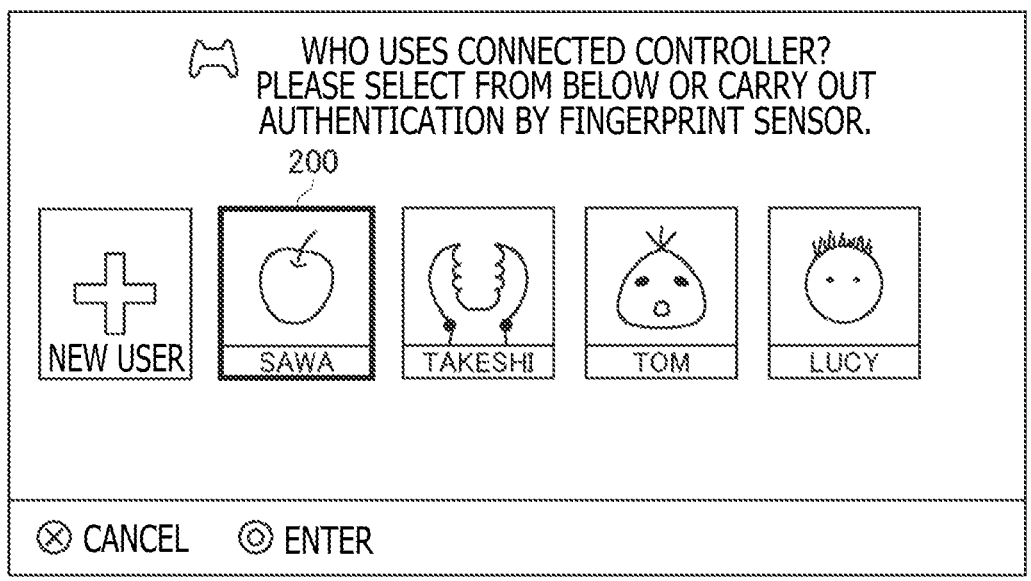
(b)
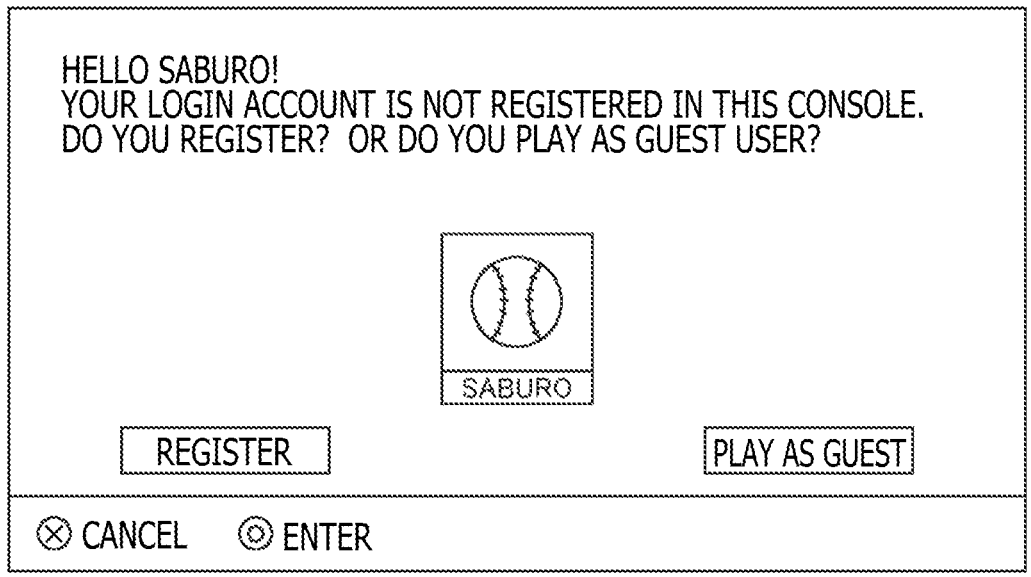

INFORMATION PROCESSING SYSTEM, INPUT DEVICE, USER AUTHENTICATION METHOD, SERVER DEVICE, AND BIOMETRIC AUTHENTICATION DEVICE

TECHNICAL FIELD

The present invention relates to a technique for authenticating a user.

BACKGROUND ART

When a user logs in to an information processing device such as a game device, the information processing device executes user authentication processing in which whether or not the user is a user registered in advance is checked. At the time of login of the user, the information processing device employs user authentication using a pass-code in many cases.

SUMMARY

Technical Problem

In recent years, user authentication processing using biological information is also generally used. In biometric authentication, the user does not have to input a pass-code and trouble for the user in the authentication is small. Particularly fingerprint authentication systems have been widely spread because it suffices for the user to only hold a finger over a fingerprint sensor and the introduction cost is comparatively inexpensive.

On the other hand, because being a simple user authentication technique, the fingerprint authentication system also involves a problem that, when a fingerprint image or feature information thereof is fraudulently stolen by a third party, it is difficult to prevent impersonation by this third party. Therefore, a technique for ensuring the safety of authentication while keeping simplicity of identity verification of the user at the time of login to a game device or the like is desired.

Therefore, the present invention intends to provide a technique for enhancing the convenience of identity verification and the safety of biometric authentication.

Solution to Problem

In order to solve the above-described problem, an information processing system of an aspect of the present invention includes an input device inputting a user operation, and an information processing device. The input device has a first communication unit transmitting user identification information for identifying a user authenticated based on biological information of the user. The information processing device has a second communication unit receiving the user identification information, a holding unit holding identification information of one or more registered users, and an authentication unit checking the received user identification information against the identification information of the registered users held in the holding unit.

Another aspect of the present invention is an input device transmitting a user operation signal to an information processing device, the input device including a holding unit holding data for authentication regarding one or more registered users, a biological information accepting unit accepting biological information of a user, an authentication unit checking the biological information accepted by the biological information accepting unit against the data for authentication held in the holding unit, and a communication unit transmitting user identification information for identifying a user authenticated by the authentication unit to the information processing device.

A further aspect of the present invention relates to a method for authenticating a user. In this user authentication method, an input device inputting a user operation transmits user identification information for identifying a user authenticated based on biological information of the user to an information processing device, and the information processing device receives the user identification information, and checks the received user identification information against identification information of one or more registered users held in a holding unit.

A further aspect of the present invention is a server device that connects to an information processing device to which a user operation signal is transmitted from an input device. The server device includes a holding unit holding identification information of a plurality of users of a service, a communication unit receiving user identification information that is transmitted from the input device to the information processing device and is not registered in the information processing device, and an authentication unit checking the received user identification information against the identification information of the users held in the holding unit. When confirming that the received user identification information is held in the holding unit, the authentication unit executes user authentication processing with the input device.

A further aspect of the present invention is a biometric authentication device connected to an input device transmitting a user operation signal to an information processing device, the biometric authentication device including a holding unit holding data for authentication regarding one or more registered users, a biological information accepting unit accepting biological information of a user, an authentication unit checking the biological information accepted by the biological information accepting unit against the data for authentication held in the holding unit, and a providing unit providing user identification information for identifying a user authenticated by the authentication unit to the input device.

What are obtained by translating arbitrary combinations of the above constituent elements and expressions of the present invention among method, device, system, recording medium, computer program, and so forth are also effective as aspects of the present invention.

BRIEF DESCRIPTION OF DRAWINGS

FIG. 5 is a diagram representing an example of the held contents of a registered user information holding unit.

FIG. 6 is a diagram representing a screen example.

FIG. 10 is a diagram representing a screen example.

DESCRIPTION OF EMBODIMENT

Figure 1:
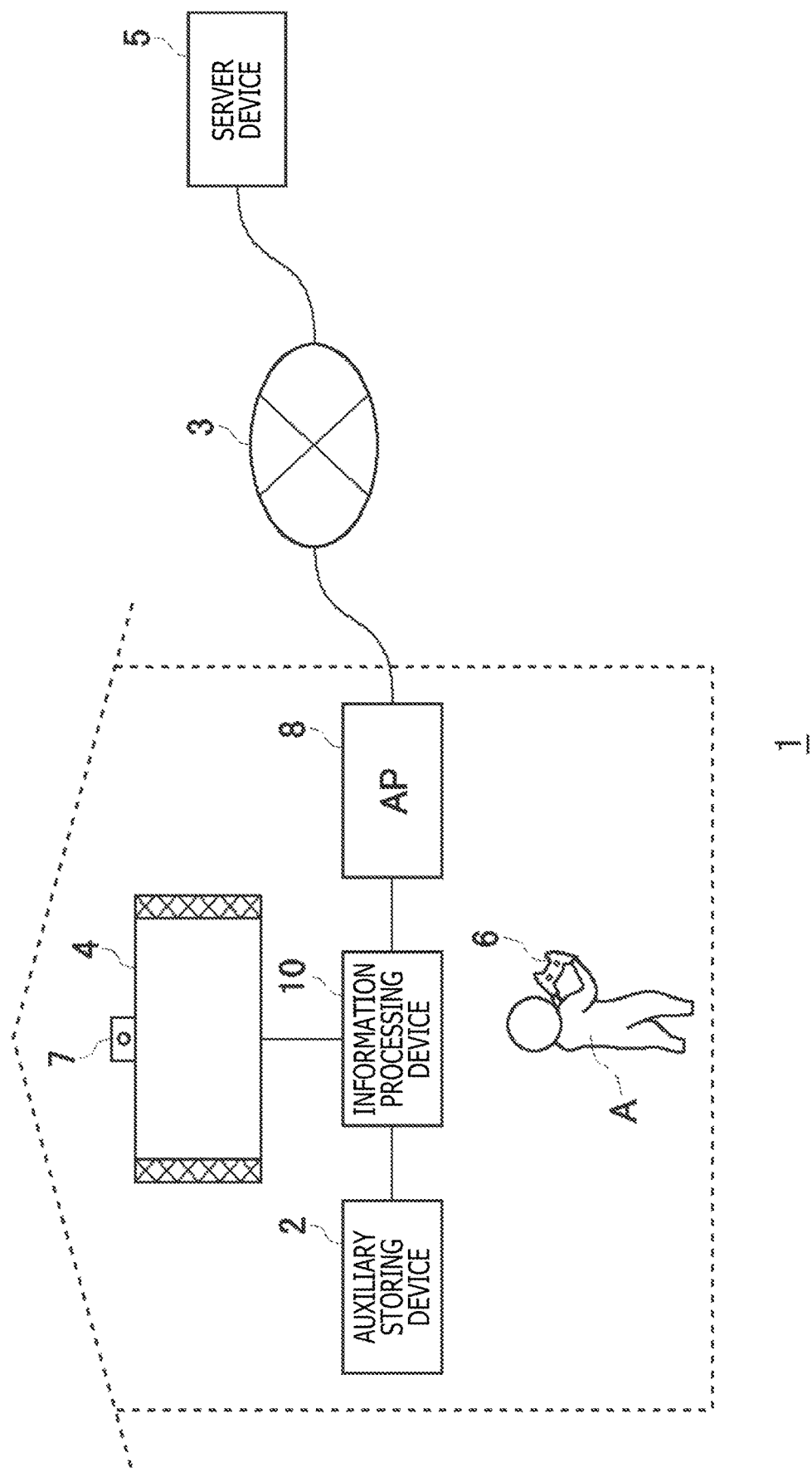
FIG. 1 is a diagram illustrating an information processing system according to an embodiment.

FIG. 1 illustrates an information processing system 1 according to an embodiment of the present invention. The information processing system 1 includes an input device 6 for inputting a user operation, an information processing device 10 that accepts the user operation and executes an application and so forth, and a server device 5 that provides various services including a network service to users. An access point (hereinafter, referred to as "AP") 8 has functions of wireless access point and router. The information processing device 10 connects to the AP 8 through a wireless or wired path and communicably connects to the server device 5 on a network 3.

An auxiliary storing device 2 is a high-capacity storing device such as a hard disk drive (HDD) or flash memory and may be an external storing device that connects to the information processing device 10 by a universal serial bus (USB) or the like and may be a built-in storing device. An output device 4 may be a television having a display that outputs an image and a speaker that outputs sound and may be a computer display. The information processing device 10 connects to the input device 6 operated by a user in a wireless or wired manner and the input device 6 transmits a user operation signal indicating the operation state of an output unit such as buttons and levers to the information processing device 10. The information processing device 10 reflects the user operation signal acquired from the input device 6 in processing of an operating system (OS) (system software) or application and causes the processing result to be output from the output device 4.

The information processing device 10 is a game device that executes a game in the information processing system 1 and the input device 6 may be equipment that supplies the operation signal of the user to the information processing device 10, such as a game controller. A camera 7 that is an imaging device is set near the output device 4 and images a space around the output device 4. The camera 7 may be a stereo camera.

The server device 5 provides a network service to users of the information processing system 1. The server device 5 manages network accounts (user identification information) to identify each user and each user signs in to the network service by using the network account. The user can register save data of games and trophies that are virtual award goods gained in game play in the server device 5 by signing in to the network service from the information processing device 10. The server device 5 holds profile information such as icon, nickname on the network (online ID), and sign-in password of the user in a user database (DB) in association with the network account.

The button configuration of the input device 6 will be described.

Figure 2:
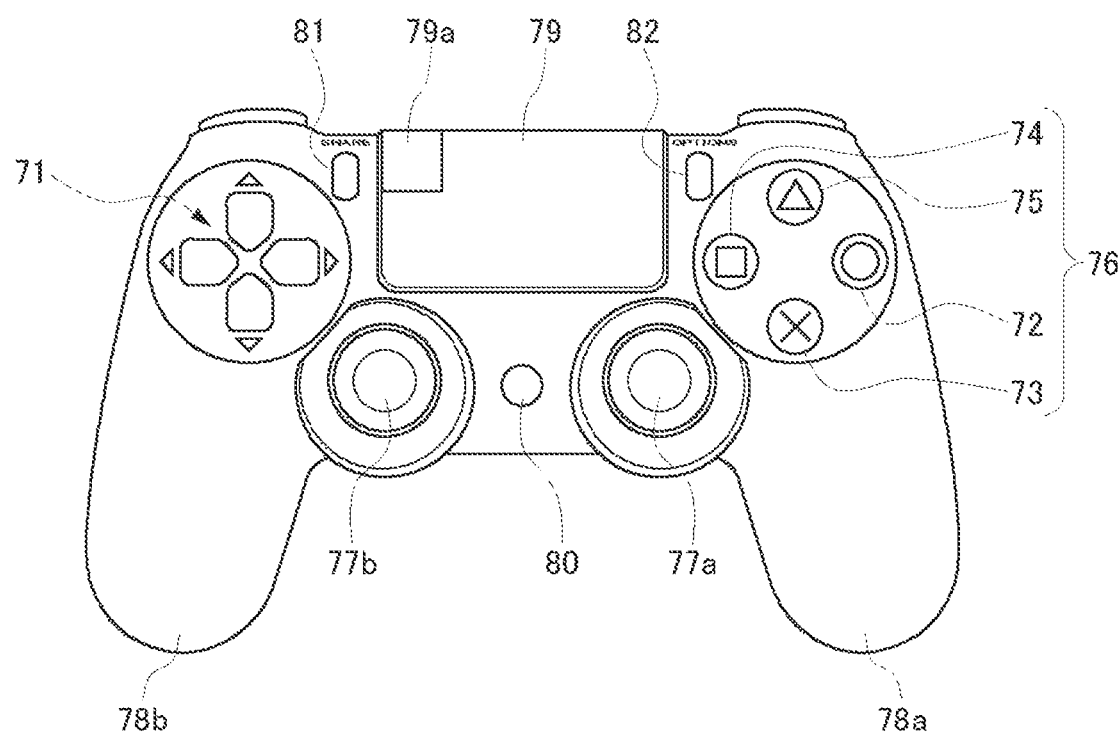
FIG. 2 is a diagram illustrating the appearance configuration of an input device.

FIG. 2 illustrates the appearance configuration of the upper surface of the input device. A user grips a left grip part 78b with the left hand and grips a right grip part 78a with the right hand to operate the input device 6. On the casing upper surface of the input device 6, direction keys 71, analog sticks 77a and 77b, and four kinds of operation buttons 76 are disposed. Different figures are depicted with different colors on the four kinds of buttons 72 to 75 in order to discriminate the buttons from each other. A red circle is depicted on the circle button 72. A blue cross is depicted on the cross button 73. A purple square is depicted on the square button 74. A green triangle is depicted on the triangle button 75.

A function button 80 is disposed between the two analog sticks 77a and 77b. The function button 80 is used to turn on the power supply of the input device 6 and simultaneously cause a communication function that connects the input device 6 and the information processing device 10 to become active. If the main power supply of the information processing device 10 is in the off-state, when the function button 80 is pressed down, the information processing device 10 accepts a connection request transmitted from the input device 6 also as an instruction for turning on the main power supply and thereby the main power supply of the information processing device 10 is turned on. After the input device 6 connects to the information processing device 10, the function button 80 is also used to cause the information processing device 10 to display a home screen.

A touchpad 79 is disposed in a flat region between the direction keys 71 and the operation buttons 76. The touchpad 79 functions also as a pressing-down button that sinks downward through pressing by the user and returns to the original position when the user separates the hand. In the flat region, a fingerprint sensor 79a that accepts finger information of the user may be disposed. When the user logs in to the information processing device 10 or when identity verification is requested by the network service, the user puts a finger on the fingerprint sensor 79a and thereby the identity verification based on fingerprint authentication is carried out. The fingerprint sensor 79a is one example of a biological information accepting unit that accepts biological information of the user and another kind of sensor may be disposed.

A SHARE button 81 is disposed between the touchpad 79 and the direction keys 71. The SHARE button 81 is used to input an instruction from the user to the OS or system software in the information processing device 10. Furthermore, an OPTIONS button 82 is disposed between the touchpad 70 and the operation buttons 76. The OPTIONS button 82 is used to input an instruction from the user to an application (game) executed in the information processing device 10.

Figure 3:
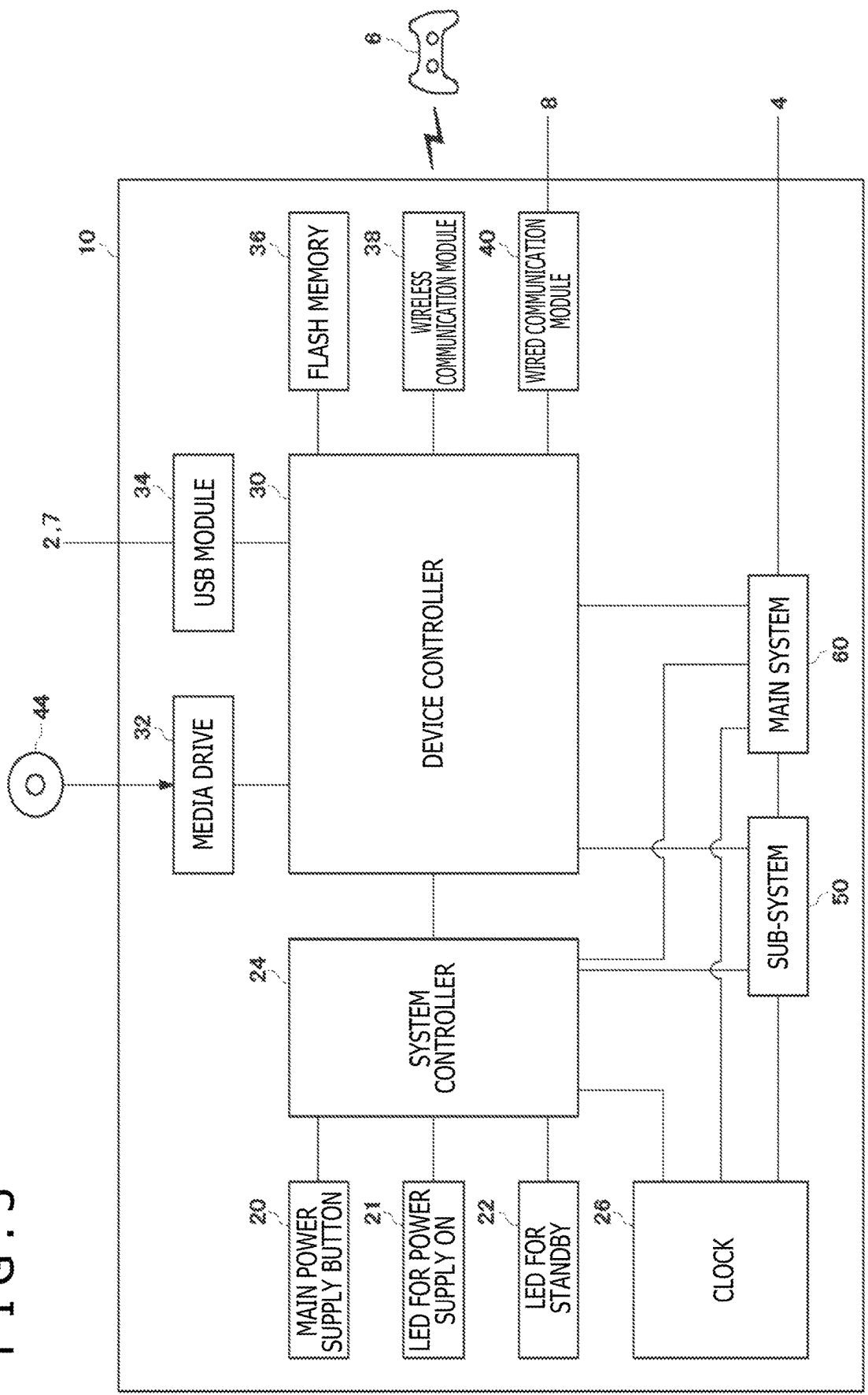
FIG. 3 is a diagram illustrating the hardware configuration of an information processing device.

FIG. 3 illustrates the hardware configuration of the information processing device 10. The information processing device 10 is configured to have a main power supply button 20, a light emitting diode (LED) 21 for power supply ON, an LED 22 for standby, a system controller 24, a clock 26, a device controller 30, a media drive 32, a USB module 34, a flash memory 36, a wireless communication module 38, a wired communication module 40, a sub-system 50, and a main system 60.

The main system 60 includes a main central processing unit (CPU), a memory that is a main storing device and a memory controller, a graphics processing unit (GPU), and so forth. The GPU is used mainly for arithmetic processing of a game program. These functions may be configured as a system-on-chip and be formed on one chip. The main CPU has a function of activating an OS and executing an application installed on the auxiliary storing device 2 under an environment provided by the OS.

The sub-system 50 includes a sub-CPU, a memory that is a main storing device, a memory controller, and so forth and does not include a GPU. The sub-CPU is what operates also while the main CPU is in the standby state and the processing functions thereof are limited in order to suppress the power consumption to low power consumption. The sub-CPU and the memory may be formed on a different chip.

The main power supply button 20 is an input unit with which an operation input from the user is carried out, and is disposed on the front surface of the casing of the information processing device 10 and is operated to turn on or off power supply to the main system 60 of the information processing device 10. That the main power supply is in the on-state means that the main system 60 is in the active state. That the main power supply is in the off-state means that the main system 60 is in the standby state. The LED 21 for power supply ON is lit when the main power supply button 20 is turned on. The LED 22 for standby is lit when the main power supply button 20 is turned off.

The system controller 24 detects pressing-down of the main power supply button 20 by the user. If the main power supply button 20 is pressed down when the main power supply is in the off-state, the system controller 24 acquires the pressing-down operation as an "ON instruction." On the other hand, if the main power supply button 20 is pressed down when the main power supply is in the on-state, the system controller 24 acquires the pressing-down operation as an "OFF instruction."

The main CPU has a function of executing a game program installed on the auxiliary storing device 2 or a read only memory (ROM) medium 44, whereas the sub-CPU does not have such a function. However, the sub-CPU has a function of accessing the auxiliary storing device 2 and a function of transmitting and receiving data with the server device 5. The sub-CPU is configured to have only such limited processing functions and therefore can operate with lower power consumption compared with the main CPU. These functions of the sub-CPU are executed when the main CPU is in the standby state. The information processing device 10 of the embodiment keeps the state in which the information processing device 10 always signs in to the network service provided by the server device 5 because the sub-system 50 is running when the main system 60 is in the standby state.

The clock 26 is a real time clock and generates present date-and-time information and supplies it to the system controller 24, the sub-system 50, and the main system 60.

The device controller 30 is configured as a large-scale integrated circuit (LSI) that carries out passing of information between devices like a southbridge. As illustrated in the diagram, to the device controller 30, devices such as the system controller 24, the media drive 32, the USB module 34, the flash memory 36, the wireless communication module 38, the wired communication module 40, the sub-system 50, and the main system 60 are connected. The device controller 30 absorbs difference in electrical characteristics of the respective devices and difference in the data transfer speed and controls the timing of data transfer.

The media drive 32 is a drive device that is loaded with the ROM medium 44 on which application software of a game or the like and license information are recorded and drives the ROM medium 44 to read out program, data, and so forth from the ROM medium 44. The ROM medium 44 is a recording medium exclusively for reading, such as an optical disc, magneto-optical disc, or Blu-ray Disc.

The USB module 34 is a module that connects to external equipment by a USB cable. The USB module 34 may connect to the auxiliary storing device 2 and the camera 7 by USB cables. The flash memory 36 is an auxiliary storing device that configures an internal storage. The wireless communication module 38 carries out wireless communication with the input device 6, for example, by a communication protocol such as the Bluetooth (registered trademark) protocol or the IEEE802.11 protocol. The wired communication module 40 carries out wired communication with external equipment and connects to the network 3 through the AP 8, for example.

For the information processing device 10 of the embodiment, at least two kinds of login processing are prepared. The outline of the two kinds of login processing will be described below.

<Login Processing 1>

Login processing 1 is processing in which a user operates the input device 6 to select user's own icon and input a pass-code for login in a user selection screen and thereby the information processing device 10 carries out user authentication and causes the user to log in.

<Login Processing 2>

Login processing 2 is processing in which, when a user puts a finger on the fingerprint sensor 79*a*, the input device 6 carries out user authentication by fingerprint verification and user authentication using user identification information is carried out on the side of the information processing device 10 to cause the user to log in.

Login processing 1 and login processing 2 are different in that the information processing device 10 carries out the user authentication using the pass-code for login in login processing 1 whereas the user authentication is carried out in both the input device 6 and the information processing device 10 in login processing 2. When login processing 1 and login processing 2 are compared, it can be said that login processing 2 is a simpler login method for the user because it suffices for the user to only put a finger on the fingerprint sensor 79*a*.

Figure 4:
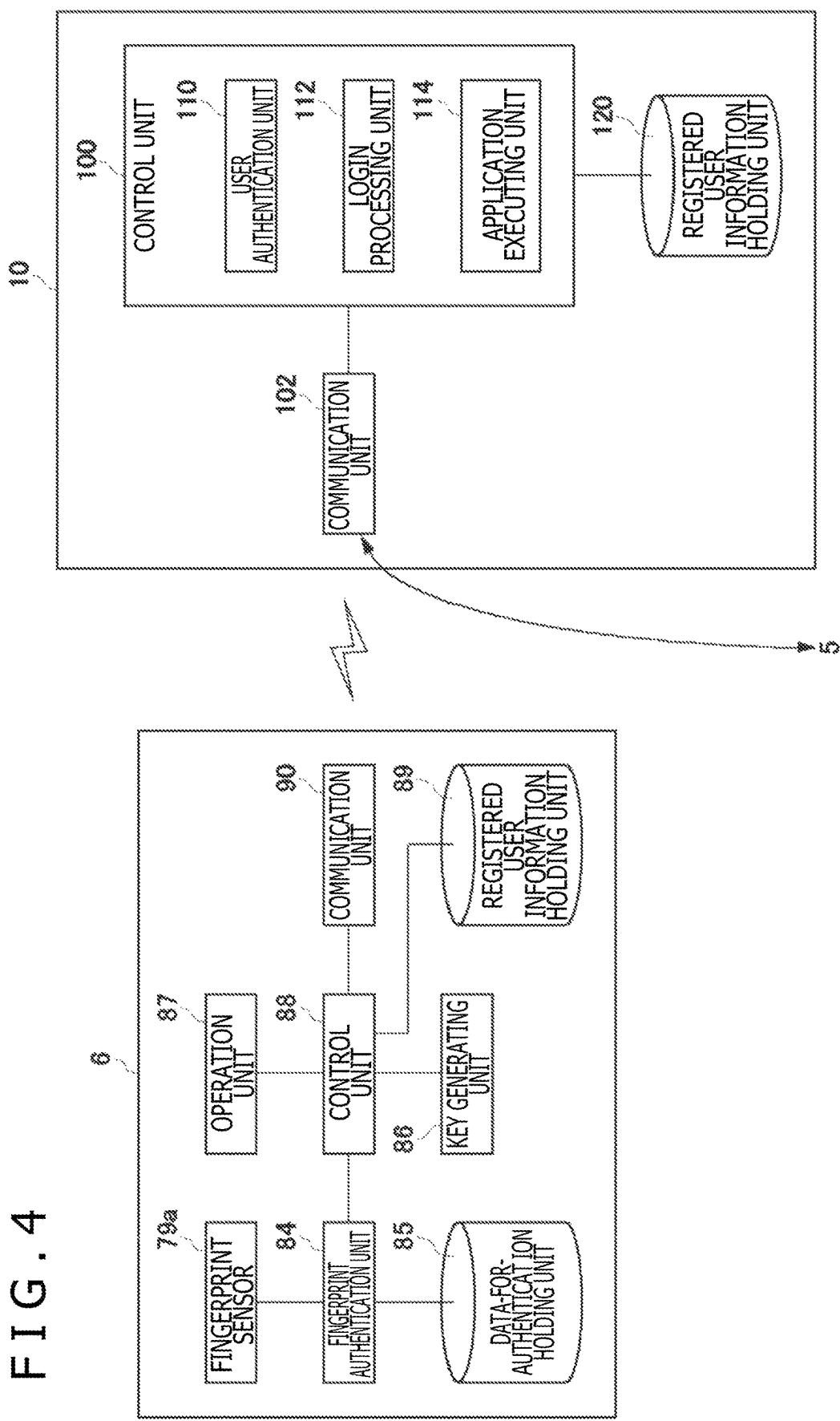
FIG. 4 is a diagram illustrating functional blocks of the input device and the information processing device.

FIG. 4 illustrates functional blocks of the input device 6 and the information processing device 10. The input device 6 includes the fingerprint sensor 79*a*, a fingerprint authentication unit 84, a data-for-authentication holding unit 85, a key generating unit 86, an operation unit 87, a control unit 88, a registered user information holding unit 89, and a communication unit 90. The operation unit 87 expresses operation members such as buttons illustrated in FIG. 2. The information processing device 10 includes a control unit 100, a communication unit 102, and a registered user information holding unit 120. The control unit 100 has a user authentication unit 110, a login processing unit 112, and an application executing unit 114. The communication unit 102 represents functions of the wireless communication module 38 and the wired communication module 40 illustrated in FIG. 3. The application executing unit 114 executes an application such as a game.

In FIG. 4, the respective elements depicted as functional blocks that execute various kinds of processing can be configured by circuit block, memory, and other LSIs in terms of hardware and are implemented by a program loaded into the memory or the like in terms of software. Therefore, it is understood by those skilled in the art that these functional blocks can be implemented in various forms by only hardware, only software, or a combination of them, and the functional blocks are not limited to any.

One characteristic of the information processing device 10 of the embodiment is that the information processing device 10 assists a suitable login operation of the user. In order to log in to the OS of the information processing device 10, as a premise thereof, the user needs to have acquired a login account and registered the necessary user information in the information processing device 10. Hereinafter, the user who has registered the login account in the information processing device 10 will be referred to also as "registered user."

The registered user information holding unit 120 holds various pieces of information relating to one or more users registered in the information processing device 10. Specifically, the registered user information holding unit 120 holds, as registered user information, pass-code for login, network account (user identification information on the network) for signing in to the server device 5, sign-in ID (e-mail address), online ID (nickname on the network), user icon (avatar) for expressing the user, and so forth in association with the login account.

The fingerprint authentication in login processing 2 of the embodiment is carried out in the input device 6 and the information processing device 10 is not involved therein. For this reason, the registered user information holding unit 120 does not hold information relating to the fingerprint of the user. Due to the conclusion of the fingerprint authentication in the input device 6, fingerprint image data of the user is not transmitted from the input device 6 to the information processing device 10. Therefore, there is no risk that the fingerprint information is intercepted by a third party on the communication path between the input device 6 and the information processing device 10.

In the input device 6, the data-for-authentication holding unit 85 holds data for authentication regarding one or more registered users. The data-for-authentication holding unit 85 may hold the data for authentication regarding plural registered users. The data for authentication may be feature data of the fingerprint image or may be the fingerprint image data itself. The data for authentication is data used as a comparison target in fingerprint verification by the fingerprint authentication unit 84 and is generated in accordance with a fingerprint recognition algorithm employed by the fingerprint authentication unit 84. For example, the data for authentication may be data obtained by extracting branch points of the fingerprint, the positions of feature points such as end points and center points, the number of ridges between feature points, and so forth. What kind of data for authentication is necessary depends on the fingerprint recognition algorithm employed by the fingerprint authentication unit 84.

<Registration Processing of Data for Authentication>

For the fingerprint authentication login, the user registers the data for authentication regarding user's own fingerprint in the input device 6. The control unit 88 executes registration processing of the data for authentication under the state in which the user who registers a fingerprint has been identified. Here, user A who is a registered user of the information processing device 10 registers a fingerprint. When user A puts a finger on the fingerprint sensor 79a, the fingerprint sensor 79a accepts fingerprint information of user A. The fingerprint sensor 79a may acquire a fingerprint image as the fingerprint information. The fingerprint authentication unit 84 generates the data for authentication from the fingerprint image accepted by the fingerprint sensor 79a. The control unit 88 causes the data-for-authentication holding unit 85 to hold the data for authentication in association with a finger ID. Here the finger ID indicates the order of registration of the data for authentication. Therefore, a finger ID "1" is allocated to the data for authentication registered first and a finger ID "2" is allocated to the data for authentication registered second.

After causing the data-for-authentication holding unit 85 to hold the data for authentication regarding user A, the control unit 88 causes the registered user information holding unit 89 to store identification information for identifying user A in association with the finger ID of user A. The control unit 88 may acquire the user identification information from the information processing device 10 after the registration of the data for authentication or may acquire it before the registration. In the information processing device 10, the registered user information holding unit 120 holds various pieces of user information that allow identification of user A. However, the control unit 88 acquires the network account for identifying the user on the network. Registering the network account in the registered user information holding unit 89 as the user identification information makes it possible to use fingerprint authentication not only at the time of login but also in the scene of identity verification in a network service as described later.

Furthermore, the control unit 88 causes the key generating unit 86 to generate a private key and a public key for being used in user authentication accompanying fingerprint authentication. The key generating unit 86 generates a private key (PRI_Key_A) and a public key (PUB_Key_A) of user A and the control unit 88 causes the registered user information holding unit 89 to store the private key (PRI_Key_A) and the public key (PUB_Key_A) generated for user A in association with the finger ID of user A.

The registered user information holding unit 89 holds the network account (NW_ID_A), the private key (PRI_Key_A), and the public key (PUB_Key_A) of user A in association with the finger ID of user A. The registered user information holding unit 89 holds information on all users for which the data for authentication regarding the fingerprint is registered in the data-for-authentication holding unit 85.

FIG. 5 represents an example of the held contents of the registered user information holding unit 89. In this example, information on user A, information on user B, and information on user C are associated with finger ID "1," finger ID "2," and finger ID "3," respectively.

When the private key and the public key of user A are generated by the key generating unit 86, the control unit 88 causes the registered user information holding unit 89 to store them in association with the finger ID. In addition, the control unit 88 causes the public key to be transmitted from the communication unit 90 to the server device 5 via the information processing device 10 together with the network account of user A. Although the communication unit 90 transmits the public key to the information processing device 10, the information processing device 10 only relays it and does not acquire the public key. When receiving the public key and the network account, the server device 5 stores the public key in the user DB in association with the network account of user A. After registering the public key, the server device 5 transfers the public key to the information processing device 10. Therefore, the information processing device 10 causes the registered user information holding unit 120 to store the public key in association with the login account of user A. Through the above, the registration processing of the data for authentication ends. Although the information processing device 10 acquires the public key from the server device 5 and stores it in the embodiment, the information processing device 10 may acquire and store the public key when it is transmitted from the communication unit 90.

The login processing unit 112 selectively executes login processing 1, which does not go through biometric authentication by the fingerprint authentication unit 84, and login processing 2, which goes through biometric authentication by the fingerprint authentication unit 84. Procedure when user A logs in to the information processing device 10 will be described below.

<Login Processing 1>

When user A presses down a predetermined button (function button 80, for example) of the input device 6, the communication unit 90 transmits pressing-down information thereof to the information processing device 10. In the information processing device 10, the communication unit 102 accepts the pressing-down information as a connection request and the communication unit 90 of the input device 6 and the communication unit 102 of the information processing device 10 connect. If the main power supply of the information processing device 10 is in the off-state, the communication unit 102 connects to the communication unit 90 after the main power supply of the information processing device 10 is turned on due to the pressing-down information of the function button 80. The pressing-down information of the function button 80 is transmitted to the login processing unit 112 and the login processing unit 112 accepts this pressing-down information as a login request from a user.

The login processing unit 112 reads out the registered user information held in the registered user information holding unit 120 and displays a selection screen for selecting a user registered in the information processing device 10 on the output device 4. This selection screen configures a login screen in login processing 1.

FIG. 6(*a*) represents one example of the user selection screen. The login processing unit 112 reads out user icons and online IDs of the registered users from the registered user information holding unit 120 and displays the read-out user icons and online IDs (hereinafter, referred to also as "user specifying information") in a list format in such a manner that the user is capable of selection.

The login processing unit 112 displays a focus frame 200 that surrounds one piece of user specifying information in such a manner that the focus frame 200 can move on the list. User A selects the user specifying information of user A by operating the operation unit 87 of the input device 6 to move the focus frame 200 to the display region of the user specifying information of user A and press the decision button (circle button 72) of the input device 6.

When user A selects "SABURO," the login processing unit 112 displays an input screen of a pass-code represented in FIG. 6(*b*) on the output device 4. User A inputs a pass-code. The user authentication unit 110 determines whether the input pass-code is the same as the pass-code for login regarding user A held in the registered user information holding unit 120, and determines whether or not to permit login of user A. If the pass-code for login is correct, the user authentication unit 110 notifies the login processing unit 112 of that the user authentication has succeeded and the login processing unit 112 causes user A to log in to the information processing device 10.

<Login Processing 2>

As displayed by text on the upper row in the user selection screen of FIG. 6(*a*), user A whose finger is registered can log in through only putting a finger on the fingerprint sensor 79*a* of the input device 6.

Figure 7:
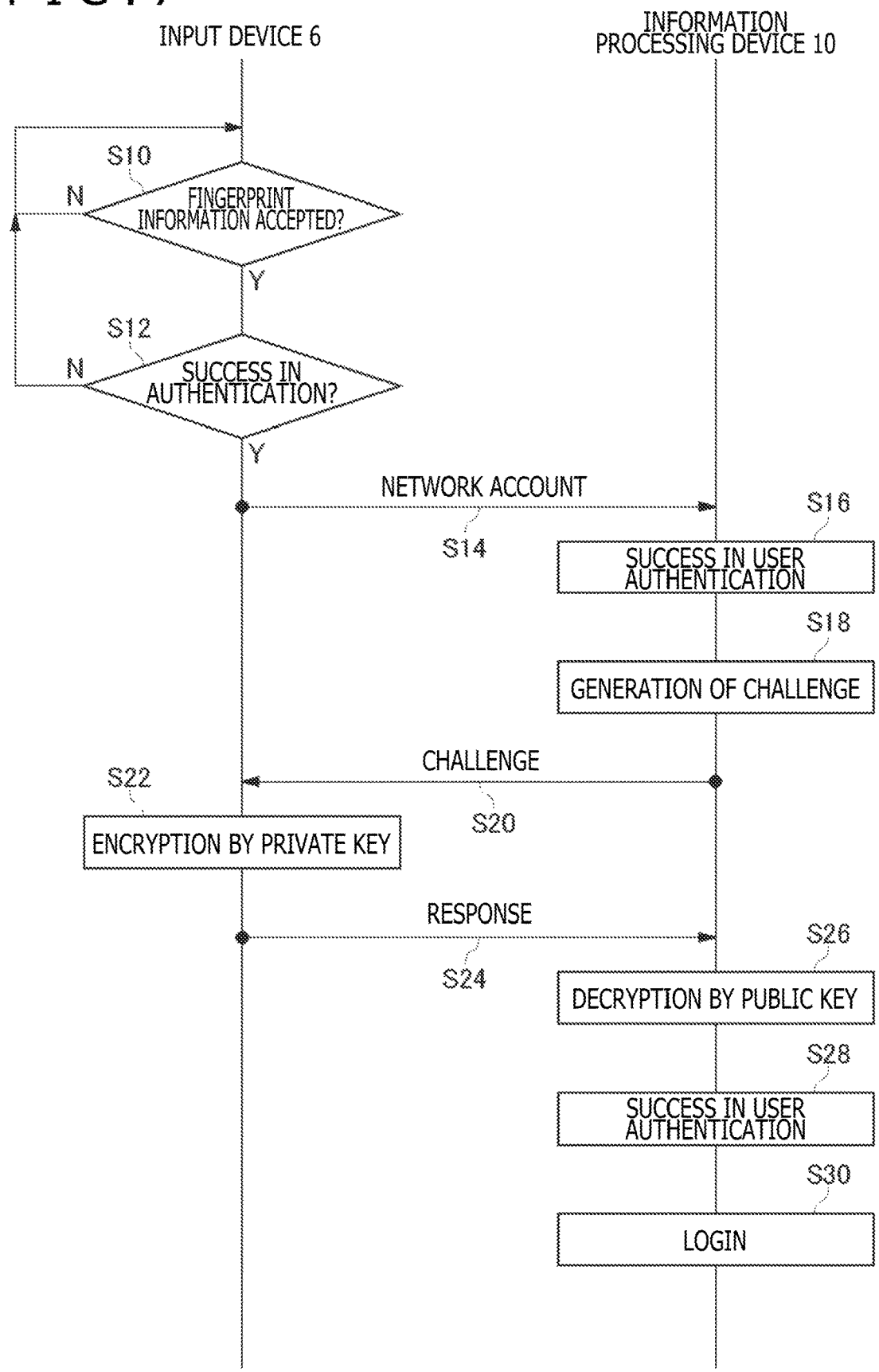
FIG. 7 is a diagram representing one example of a login sequence.

FIG. 7 represents one example of the sequence of login processing 2. While the user selection screen represented in FIG. 6(*a*) is displayed, the fingerprint sensor 79*a* keeps the state in which fingerprint information can be accepted (N of S10). When user A disposes a finger on the fingerprint sensor 79*a*, the fingerprint sensor 79*a* accepts fingerprint information of user A (Y of S10) and supplies it to the fingerprint authentication unit 84. The fingerprint authentication unit 84 checks the fingerprint information accepted by the fingerprint sensor 79*a* against the data for authentication regarding one or more registered users held in the data-for-authentication holding unit 85, and authenticates that user A is a registered user (Y of S12). If user A has not registered the fingerprint, the fingerprint authentication unit 84 fails in the user authentication (N of S12).

If the fingerprint authentication unit 84 succeeds in the fingerprint authentication, the finger ID of the data for authentication that matches the fingerprint information is notified to the control unit 88. The control unit 88 reads out the network account associated with the notified finger ID from the registered user information holding unit 89. The network account is user identification information for identifying user A. The communication unit 90 transmits the network account (NW_ID_A) of user A to the information processing device 10 (S14).

In the information processing device 10, the communication unit 102 receives the network account (NW_ID_A) of user A. The user authentication unit 110 refers to the registered user information holding unit 120 and checks whether NW_ID_A is held as the network account of the registered user. Here, the user authentication unit 110 checks the received NW_ID_A against the network accounts of one or more registered users held in the registered user information holding unit 120. The registered user information holding unit 120 holds NW_ID_A as the network account of user A and the user authentication unit 110 authenticates that the user who is requesting login is user A (S16). This authentication using the user identification information is authentication of a first stage.

Subsequently, the user authentication unit 110 executes user authentication processing based on another method in order to check whether the user authenticated in S16 is really user A. This user authentication processing is authentication of a second stage and the user authentication unit 110 carries out authentication of a challenge-response system using public-key cryptography.

The user authentication unit 110 generates a random number called a challenge (S18) and the communication unit 102 transmits the challenge to the communication unit 90 (S20). The control unit 88 encrypts the challenge by the private key of user A (S22) and the communication unit 90 returns the encrypted challenge as a response to the communication unit 102 (S24). The user authentication unit 110 decrypts the response by using the public key of user A (S26). If the decryption result corresponds with the challenge, the user authentication unit 110 completes the identity verification of user A who is requesting login (S28). After the two times of user authentication in the information processing device 10, the login processing unit 112 causes user A to log in (S30).

Figure 8:
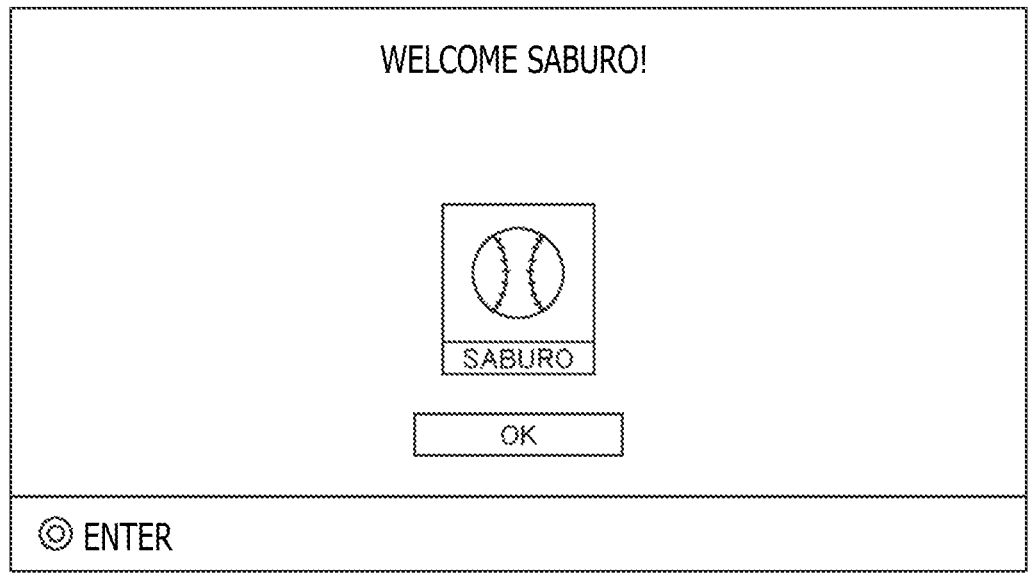
FIG. 8 is a diagram representing a screen example.

FIG. 8 represents an example of a screen displayed by the login processing unit 112 at the time of login. User A can log in to the information processing device 10 by only holding a finger over the fingerprint sensor 79*a*. In the fingerprint authentication processing of the embodiment, the fingerprint information of user A is not transmitted from the input device 6 to the external. For this reason, in the information processing system 1, there is no risk that the fingerprint information is intercepted by a third party on the communication path between the input device 6 and the information processing device 10, and the safety of the fingerprint authentication can be ensured.

As described above, user A can make fingerprint authentication login to the information processing device 10 in which the login account is registered. In the following, a use scene will be described in which user A takes the input device 6 in which a fingerprint of user A is registered from the home of user A to a friend's house and plays a game with the friend with an information processing device 10*a* at the friend's house. Naturally, the login account of user A is not registered in the information processing device 10*a* at the friend's house.

Figure 9:
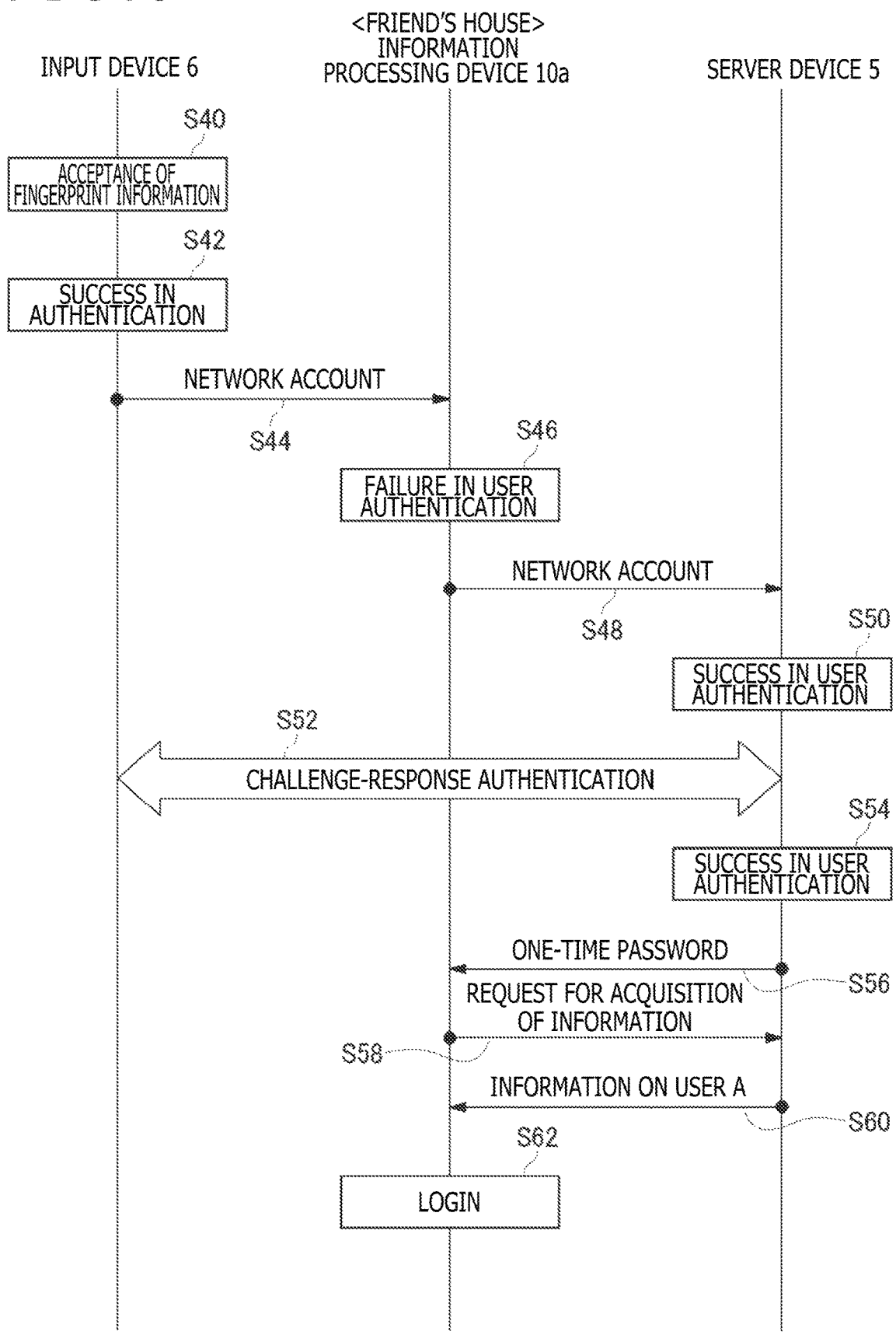
FIG. 9 is a diagram representing another example of the login sequence.

FIG. 9 represents another example of the sequence of login processing 2. In this example, user A logs in to the information processing device 10*a* at the friend's house and thereby user A can play a game with the friend. The information processing device 10*a* has the same configuration and functions as the information processing device 10 illustrated in FIG. 4.

When user A presses down a predetermined button (function button 80, for example) of the input device 6 at the friend's house, the communication unit 90 transmits pressing-down information thereof to the information processing device 10*a*. In the information processing device 10*a*, the communication unit 102 accepts the pressing-down information as a connection request and the communication unit 90 of the input device 6 and the communication unit 102 of the information processing device 10*a* connect. The pressing-down information of the function button 80 is transmitted to the login processing unit 112 and the login processing unit 112 accepts this pressing-down information as a login request from a user.

The login processing unit 112 reads out the registered user information held in the registered user information holding unit 120 and displays a selection screen for selecting a user registered in the information processing device 10*a* on the output device 4. This selection screen configures the login screen in login processing 1.

FIG. 10(*a*) represents an example of the user selection screen. The login processing unit 112 reads out user icons and online IDs of the registered users from the registered user information holding unit 120 of the information processing device 10*a* and displays the read-out user icons and online IDs in a list format in such a manner that the user is capable of selection.

The login processing unit 112 displays the focus frame 200 that surrounds one piece of user specifying information in such a manner that the focus frame 200 can move on the list. Information on user A is not registered in the information processing device 10*a* at the friend's house and therefore the identifying information of user A is not included in the list. User A can create a login account in the information processing device 10*a* by moving the focus frame 200 to the display region of "new user" and pressing the decision button (circle button 72) of the input device 6 and inputting the necessary information. However, this work is work of operating the input device 6 to enter text and is troublesome. So, the information processing system 1 provides a mechanism in which user A can easily log in also to the information processing device 10*a* at the friend's house through fingerprint authentication by the input device 6.

While the user selection screen represented in FIG. 10(*a*) is displayed, the fingerprint sensor 79*a* of the input device 6 keeps the state in which fingerprint information can be accepted. When user A disposes a finger on the fingerprint sensor 79*a*, the fingerprint sensor 79*a* accepts fingerprint information of user A (S40) and supplies it to the fingerprint authentication unit 84. The fingerprint authentication unit 84 checks the fingerprint information accepted by the fingerprint sensor 79*a* against the data for authentication regarding one or more registered users held in the data-for-authentication holding unit 85, and authenticates that user A is a registered user (S42).

If the fingerprint authentication unit 84 succeeds in the fingerprint authentication, the finger ID of the data for authentication that matches the fingerprint information is notified to the control unit 88. The control unit 88 reads out the network account associated with the notified finger ID from the registered user information holding unit 89. The network account is user identification information for identifying user A. The communication unit 90 transmits the network account (NW_ID_A) of user A to the information processing device 10*a* (S44).

In the information processing device 10*a*, the communication unit 102 receives the network account (NW_ID_A) of user A. The user authentication unit 110 refers to the registered user information holding unit 120 and checks whether NW_ID_A is held as the network account of the registered user. As described above, NW_ID_A is not registered in the information processing device 10*a* at the friend's house. Thus, the user authentication unit 110 fails in the authentication of user A (S46). Upon the failure in the authentication of user A, the login processing unit 112 transmits the network account (NW_ID_A) of user A to the server device 5 (S48).

Figure 11:
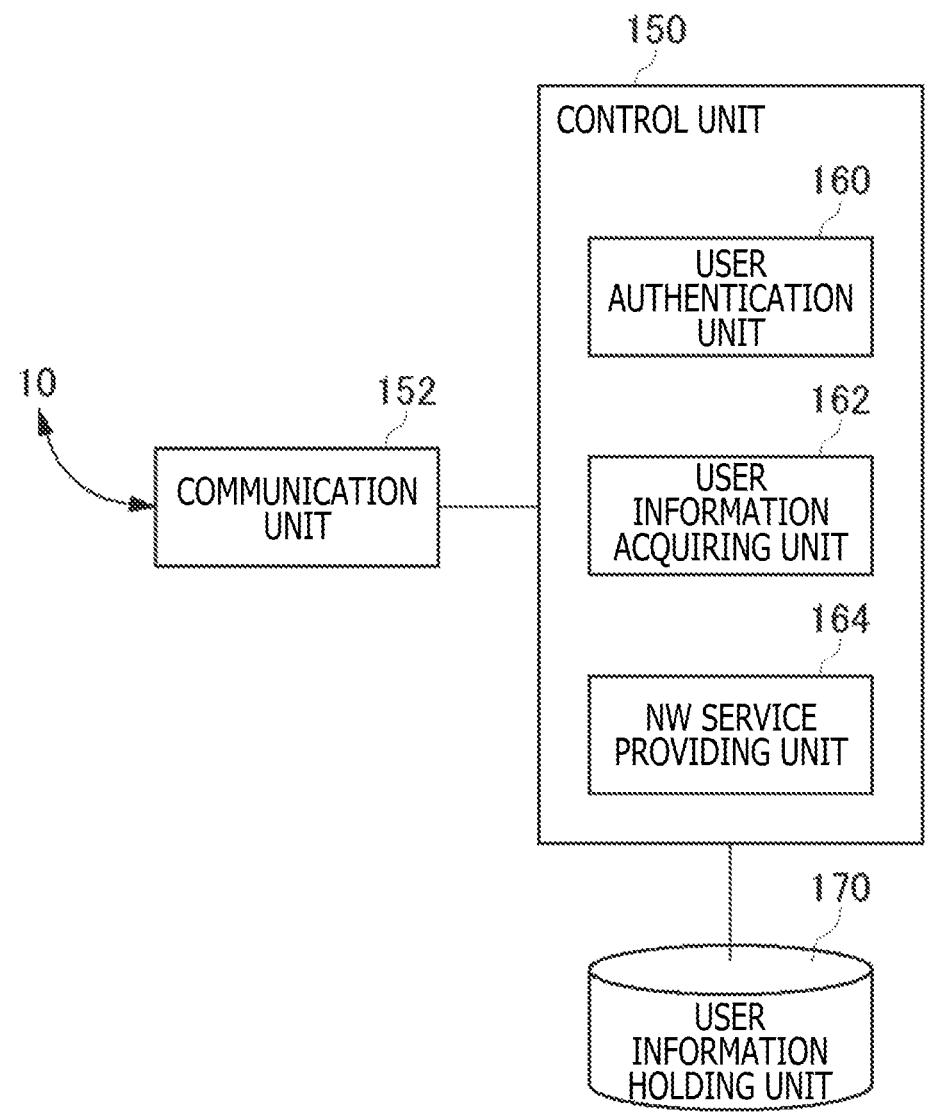
FIG. 11 is a diagram illustrating functional blocks of a server device.

FIG. 11 illustrates functional blocks of the server device 5. The server device 5 includes a control unit 150, a communication unit 152, and a user information holding unit 170 and the control unit 150 has a user authentication unit 160, a user information acquiring unit 162, and an NW service providing unit 164. The server device 5 has a user authentication function and can also be referred to as an information processing device in that sense. The user information holding unit 170 is a user DB that holds profile information, save data, and so forth of all users who use the network service. The user information holding unit 170 holds pieces of the profile information such as sign-in IDs, online IDs, user icons, sign-in passwords, and public keys in association with network accounts of users.

In FIG. 11, the respective elements depicted as functional blocks that execute various kinds of processing can be configured by circuit block, memory, and other LSIs in terms of hardware and are implemented by a program loaded into the memory or the like in terms of software. Therefore, it is understood by those skilled in the art that these functional blocks can be implemented in various forms by only hardware, only software, or a combination of them, and the functional blocks are not limited to any.

In the server device 5, the communication unit 152 receives the network account (NW_ID_A) of user A from the information processing device 10*a*. The network account (NW_ID_A) of user A is identification information transmitted from the input device 6 to the information processing device 10*a* and is identification information that is not registered in the information processing device 10*a*. The user authentication unit 160 refers to the user information holding unit 170 and checks whether NW_ID_A is held as the network account of the user. Here the user authentication unit 160 checks the received NW_ID_A against the network accounts of plural users held in the user information holding unit 170. The user information holding unit 170 holds NW_ID_A as the network account of user A and the user authentication unit 160 authenticates that the user who is requesting login is user A (S50). This authentication using the user identification information is authentication of a first stage.

Subsequently, the user authentication unit 160 executes user authentication processing based on another method with the input device 6 in order to check whether the user authenticated in S50 is really user A. This user authentication processing is authentication of a second stage and the user authentication unit 160 carries out authentication of a challenge-response system using public-key cryptography (S52) with the input device 6. In S52, the respective steps of S18 to S26 represented in FIG. 7 are carried out between the server device 5 and the input device 6. The information processing device 10a relays data communication of both.

If the result of decryption of the response by the public key of user A corresponds with the challenge, the user authentication unit 160 completes the identity verification of user A who is requesting login (S54). After the two times of user authentication in the server device 5, the user information acquiring unit 162 issues a one-time password and the communication unit 152 transmits the one-time password to the information processing device 10a (S56). In the information processing device 10a, the login processing unit 112 generates a request for acquisition of information relating to user A by using the one-time password and the communication unit 102 transmits the request for acquisition of information relating to user A to the server device 5 (S58). In response to this, the user information acquiring unit 162 acquires the profile information of user A from the user information holding unit 170 and the communication unit 152 transmits the profile information of user A to the information processing device 10a (S60). The transmitted profile information of user A includes the information necessary for the information processing device 10a to cause user A to log in. For example, the profile information may be sign-in ID, online ID, user icon, sign-in password, public key, and so forth of user A.

In the information processing device 10a, when the communication unit 102 receives the profile information of user A, the login processing unit 112 causes the output device 4 to display a login screen and causes user A to log in to the information processing device 10a (S62).

FIG. 10(b) represents an example of the login screen of user A. User A logs in to the information processing device 10a as a registered user when selecting "register." User A logs in to the information processing device 10a as a temporary guest user when selecting "play as guest." The login as a registered user means that the user information is registered in the registered user information holding unit 120 of the information processing device 10a.

As described above, according to the information processing system 1, even when user registration in the information processing device 10a has not been carried out, user A can log in to the information processing device 10a by only holding a finger over the fingerprint sensor 79a. This is none other than because the registered user information holding unit 89 of the input device 6 is caused to hold the network account as the user identification information.

For example, identity verification based on fingerprint authentication may be carried out also when identity verification is requested in a network service provided by the NW service providing unit 164 of the server device 5. Also in this case, the respective steps of S50 to S54 represented in FIG. 9 are carried out between the input device 6 and the server device 5.

The present invention is described above based on the embodiment. This embodiment is exemplification and it is understood by those skilled in the art that various modification examples are possible in combinations of the respective constituent elements and the respective processing processes thereof and such modification examples also fall within the range of the present invention. Although description is made regarding fingerprint authentication in the embodiment, the input device 6 may have another kind of biometric authentication function.

In the embodiment, the fingerprint sensor 79a is disposed in the flat region in which the touchpad 79 is disposed. However, it may be disposed at another place. For example, when the fingerprint sensor 79a is disposed on the function button 80, a mechanism in which a user can log in to the information processing device 10 by only pressing down the function button 80 is implemented.

Figure 12:
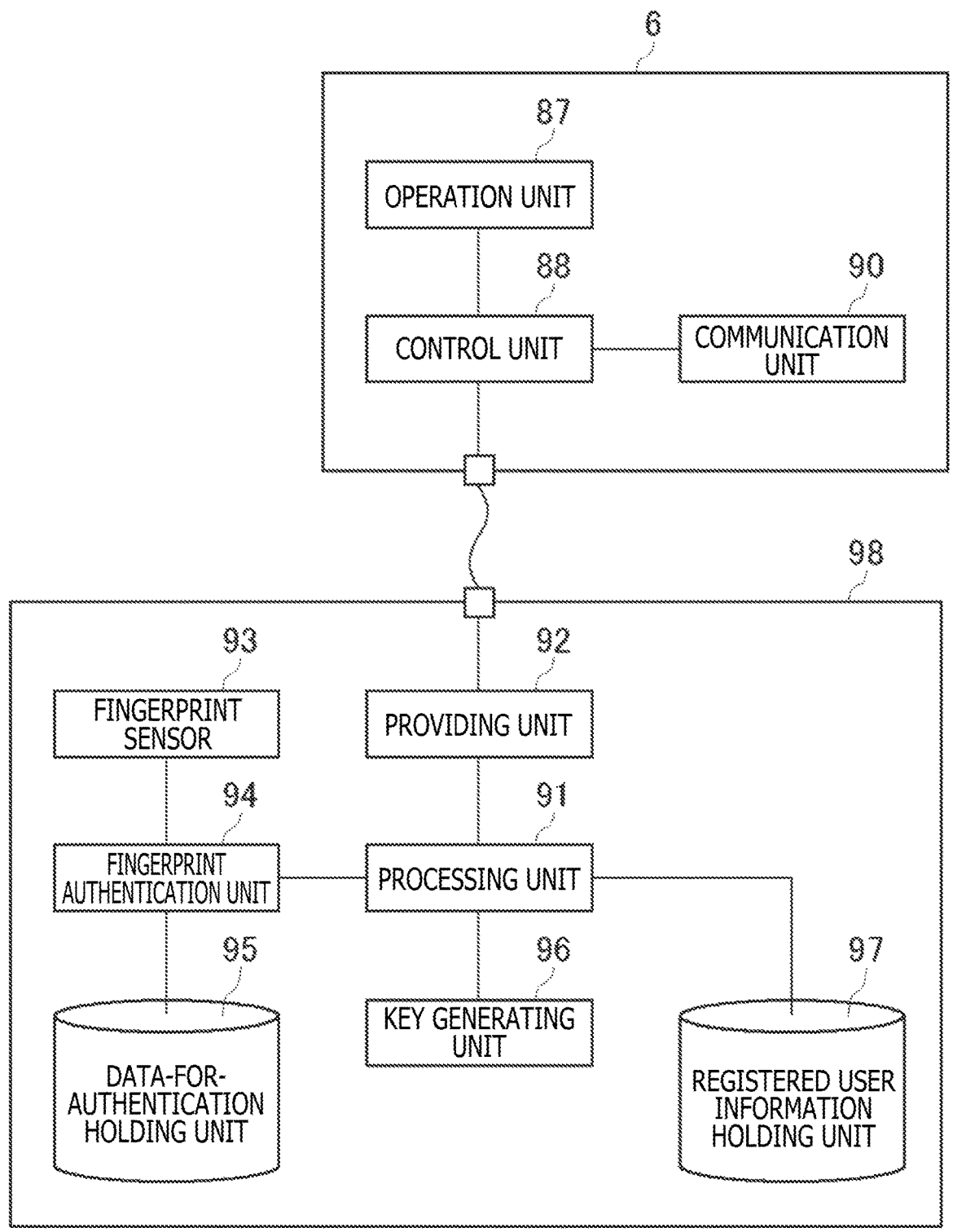
FIG. 12 is a diagram illustrating functional blocks of an input device and a biometric authentication device.

FIG. 12 illustrates functional blocks of the input device 6 and a biometric authentication device 98 in a modification example. The input device 6 includes the operation unit 87, the control unit 88, and the communication unit 90 and transmits a user operation signal to the information processing device 10. The operation unit 87 expresses operation members such as buttons illustrated in FIG. 2. The biometric authentication device 98 includes a processing unit 91, a providing unit 92, a fingerprint sensor 93, a fingerprint authentication unit 94, a data-for-authentication holding unit 95, a key generating unit 96, and a registered user information holding unit 97. The biometric authentication device 98 is an external device that executes biometric authentication and may be connected to the input device 6 by a USB cable, for example.

The biometric authentication device 98 implements the biometric authentication function in the input device 6 illustrated in FIG. 4. Specifically, the fingerprint sensor 93, the fingerprint authentication unit 94, the data-for-authentication holding unit 95, the key generating unit 96, and the registered user information holding unit 97 in FIG. 12 correspond to the fingerprint sensor 79a, the fingerprint authentication unit 84, the data-for-authentication holding unit 85, the key generating unit 86, and the registered user information holding unit 89, respectively, in FIG. 4.

The data-for-authentication holding unit 95 holds the data for authentication regarding one or more registered users. The data-for-authentication holding unit 85 may hold the data for authentication regarding plural users registered in the information processing device 10. In user login, the fingerprint sensor 93 keeps the state in which fingerprint information can be accepted. When the fingerprint sensor 93 accepts fingerprint information of a user, the fingerprint authentication unit 94 checks the fingerprint information accepted by the fingerprint sensor 93 against the data for authentication regarding one or more registered users held in the data-for-authentication holding unit 95, and confirms that the user is a registered user.

When succeeding in the fingerprint authentication, the fingerprint authentication unit 94 notifies the finger ID of the data for authentication that matches the fingerprint information to the processing unit 91. The processing unit 91 reads out the network account associated with the notified finger ID from the registered user information holding unit 97. The providing unit 92 provides the network account of the user to the input device 6. When receiving the network account, the control unit 88 causes the network account to be transmitted from the communication unit 90 to the information processing device 10. Login processing in the information processing device 10 is as described in the embodiment.

INDUSTRIAL APPLICABILITY

The present invention can be used in a field of a technique for authenticating a user.

REFERENCE SIGNS LIST

1 . . . Information processing system, 5 . . . Server device, 6 . . . Input device, 10, 10a . . . Information processing device, 84 . . . Fingerprint authentication unit, 85 . . . Data-for-authentication holding unit, 86 . . . Key generating unit, 87 . . . Operation unit, 88 . . . Control unit, 89 . . . Registered user information holding unit, 90 . . . Communication unit, 100 . . . Control unit, 102 . . . Communication unit, 110 . . . User authentication unit, 112 . . . Login processing unit, 114 . . . Application executing unit, 120 . . . Registered user information holding unit, 150 . . . Control unit, 152 . . . Communication unit, 160 . . . User authentication unit, 162 . . . User information acquiring unit, 164 . . . NW service providing unit, 170 . . . User information holding unit

The invention claimed is:

1. An information processing system comprising:
    an input device inputting a user operation;
    an information processing device accessing a network service; and
    a server device providing the network service to a user, wherein
    the input device has a first communication unit transmitting input device user identification information that identifies an input device user authenticated by the input device based on biological information of the user,
    the information processing device has
    a second communication unit receiving the transmitted input device user identification information,
    an information-processing-device-side holding unit holding information for authenticating users of the information processing device, and
    an information-processing-device-side authentication unit checking the transmitted input device user identification information against the information for authenticating users of the information processing device,
    the server device has
    a server-side holding unit holding information for authenticating users of the network service,
    a third communication unit receiving the input device user identification information from the second communication unit of the information processing device, and
    a server-side authentication unit checking the received input device user identification information against the information for authenticating users of the network service,
    in the information processing device, the second communication unit transmits the input device user identification information to the server device if the information-processing-device-side authentication unit fails in authenticating the input device user identification information, and
    in the server device, when the third communication unit receives the input device user identification information, the server-side authentication unit checks the received input device user identification information against the information for authenticating users of the network service;
    wherein success in authenticating the input device user identification information by the server-side authentication unit authenticates the user as a user of the network service and does not authenticate the user as a registered user of the information processing device.

2. The information processing system according to claim 1, wherein
    the server device further has an information acquiring unit acquiring profile information of a user for which authentication has succeeded, and
    the third communication unit transmits the profile information to the information processing device.

3. The information processing system according to claim 2, wherein
    the information processing device includes a login processing unit causing a user authenticated by the information-processing-device-side authentication unit to log in,
    the second communication unit receives the profile information from the third communication unit, and
    the login processing unit causes the user to log in, by using the profile information received by the third communication unit.

4. The information processing system according to claim 2, wherein the profile information includes information required for causing the user to log in.

5. The information processing system according to claim 1, wherein the input device includes:
    an input-device-side holding unit holding data for authentication regarding one or more registered users,
    a biological information accepting unit accepting biological information of a user, and
    a biometric authentication unit checking the biological information accepted by the biological information accepting unit against the data for authentication held in the input-device-side holding unit.

6. The information processing system according to claim 1, wherein the input device further includes a control unit acquiring user identification information of a user biometrically authenticated by an external authentication device.

7. The information processing system according to claim 1, wherein the information-processing-device-side authentication unit executes user authentication processing based on another method after authenticating a user by using user identification information.

8. A server device providing a network service to a user by connecting to an information processing device accessing a network service, to which information processing device a user operation signal is transmitted from an input device, comprising:
    a holding unit holding identification information for authenticating a plurality of network service users, the network service users being users of the network service;
    a communication unit receiving input device user identification information from the information processing device, wherein the input device user identification information identifies an input device user authenticated by the input device based on biological information of the input device user, is transmitted from the input device to the information processing device and, is not registered in the information processing device; and
    an authentication unit checking the received input device user identification information against the identification information for authenticating a plurality of network service users,
    wherein, when the communication unit receives the input device user identification information, the authentication unit checks the received input device user identification information against the information for authenticating a plurality of network service users; and
    wherein success in authenticating the input device user identification information by the authentication unit authenticates the user as a user of the network service and does not authenticate the user as a registered user of the information processing device.

9. The server device according to claim 8, wherein, when the authentication unit succeeds in user authentication, the communication unit transmits profile information of a relevant user to the information processing device.

* * * * *